(12) United States Patent
Suzuki

(10) Patent No.: US 8,057,048 B2
(45) Date of Patent: Nov. 15, 2011

(54) PROJECTOR

(75) Inventor: Masakazu Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 404 days.

(21) Appl. No.: 12/274,580

(22) Filed: Nov. 20, 2008

(65) Prior Publication Data
US 2009/0141248 A1  Jun. 4, 2009

(30) Foreign Application Priority Data
Dec. 3, 2007 (JP) .................................. 2007-311873

(51) Int. Cl.
*G03B 21/16* (2006.01)

(52) U.S. Cl. ............... 353/52; 353/56; 353/57; 353/58; 353/59; 353/60; 353/61; 353/119; 348/335; 348/336; 348/337; 348/338; 348/339

(58) Field of Classification Search .................. 353/119, 353/52, 56–61; 348/335, 336, 337, 338, 348/339; 359/634, 820; 361/700
See application file for complete search history.

(56) References Cited

U.S. PATENT DOCUMENTS

| 6,422,703 | B1 * | 7/2002 | Wang et al. ............... 353/61 |
| 6,905,214 | B2 * | 6/2005 | Tani ................................. 353/56 |
| 7,400,439 | B2 * | 7/2008 | Holman ....................... 359/298 |
| 7,411,789 | B2 * | 8/2008 | Nishimura .................. 361/697 |
| 2002/0033992 | A1 * | 3/2002 | Den Bossche et al. ....... 359/292 |
| 2005/0012905 | A1 * | 1/2005 | Morinaga ..................... 353/58 |
| 2006/0146293 | A1 * | 7/2006 | Morimoto et al. .......... 353/61 |
| 2006/0176453 | A1 * | 8/2006 | Miyamoto ................. 353/119 |
| 2008/0024733 | A1 * | 1/2008 | Gerets et al. .................. 353/52 |
| 2008/0053749 | A1 * | 3/2008 | Utsunomiya ............... 181/286 |

FOREIGN PATENT DOCUMENTS

| JP | 2003-337380 A | 11/2003 |
| JP | 3108585 U | 2/2005 |
| JP | 2006-259282 A | 9/2006 |
| JP | 2006-293117 A | 10/2006 |
| JP | 2007-127856 A | 5/2007 |

* cited by examiner

*Primary Examiner* — Georgia Y Epps
*Assistant Examiner* — Sultan Chowdhury
(74) *Attorney, Agent, or Firm* — Global IP Counselors

(57) ABSTRACT

A projector includes an optical arrangement and a cooling arrangement. The optical arrangement includes a light source, a filtering component, a light modulation component and a projection lens. The filtering component filters the light emitted by the light source. The light modulation component modulates the light filtered by the filtering component to form an image. The projection lens projects the image formed by the light modulation component. The cooling arrangement is arranged relative to the optical arrangement to cool the optical arrangement. The cooling arrangement includes a blower, an air duct and a heat sink. The blower blows cooling air. The air duct guides the cooling air from the blower to the filtering component along an cooling air path. The heat sink is disposed in the cooling air path within the air duct and fixedly attached to the light modulation component to thermally contact with the light modulation component.

12 Claims, 6 Drawing Sheets

PROJECTOR

CROSS-REFERENCE TO RELATED APPLICATIONS

This application claims priority to Japanese Patent Application No. 2007-311873 filed on Dec. 3, 2007. The entire disclosure of Japanese Patent Application No. 2007-311873 is hereby incorporated herein by reference.

BACKGROUND OF THE INVENTION

1. Field of the Invention

The present invention generally relates to a projector. More specifically, the present invention relates to a projector having a cooling arrangement to cool an optical arrangement.

2. Background Information

DLP (Digital Light Processing®) projector is a reflecting type of display device. In the DLP projector, light from a light source is filtered, and the light is reflected on a DMD (Digital Micromirror Device). The DMD is a semiconductor element. The light reflected on the DMD is expanded and projected by a lens. Then, image colorization is performed.

The DLP projector includes a light source, an optical engine system and an external housing. The optical engine system includes a color wheel, a light tunnel, a DMD and a housing that houses the color wheel, the light tunnel and the DMD. The external housing houses the light source and the housing. When the light source generates heat up to a high temperature, the color wheel, the light tunnel, and the DMD located on a light path of the light emitted from the light source are heated up, too. The elevation in temperature cause operating performance and durability of the color wheel, the light tunnel and the DMD to be diminished.

In view of this, a heat sink is attached to the DMD and a fan is provided to the external housing. The heat sink is exposed to an outside of the housing. The fan blows cooling air through an inside of the external housing to promoted heat dispersal by the heat sink, to suppress temperature elevation of the DMD, and to suppress temperature elevation of the light tunnel and the color wheel.

With conventional projectors, cooling is performed by blowing air against optical elements used in the projectors.

For example, a fan is used for sending cooling air through an interior of an external housing (see Japanese Patent Utility Model Registration 3,108,585, for example).

With a conventional projector, a duct is used to blow cooling air along a fixed path. Specifically, the cooling air is circulated in the duct with a fan (see Japanese Laid-Open Patent Application Publication No. 2003-337380, for example). Then, heat exchange is performed by blowing the cooling air, which has cooled along a circulation path, against hot optical elements (such as the light tunnel). Furthermore, the cooling air that has been heated through the heat exchange is cooled again. With another conventional projector, cooling air is drawn in by a sirocco fan. The cooling air is passed through a duct and guided to a light source unit (see Japanese Laid-Open Patent Application Publication No. 2006-293117, for example). With another conventional projector, cooling air discharged from a cooling fan blows at the DMD (see Japanese Laid-Open Patent Application Publication No. 2006-259282, for example).

Furthermore, with conventional projectors, cooling methods involves liquid cooling (see Japanese Laid-Open Patent Application Publication No. 2006-259282 and Japanese Laid-Open Patent Application Publication No. 2007-127856, for example).

However, with the conventional projector, the cooling air from the fan is diffused in the interior of the housing. Thus, it is difficult to raise the efficiency of cooling the DMD. The same can be said about the efficiency of cooling the light tunnel or the color wheel.

In contrast, Japanese Laid-Open Patent Application Publication No. 2003-337380 involves cooling the light tunnel by utilizing a heat exchange cycle of air circulating through the duct. Thus, extra space in which to install a ring-shaped duct is required. Furthermore, an extra air drying agent is also required. Thus, the temperature of the circulating air rises gradually, which worsens cooling efficiency.

Furthermore, with Japanese Laid-Open Patent Application Publication No. 2006-293117, the cooling air discharged through the duct into the interior of the light source unit flows through the interior of the housing. Thus, the cooling air flowing through the interior of the housing becomes hot. Then, it is difficult to obtain low-temperature cooling air for efficiently cooling the light tunnel and the DMD.

Furthermore, with Japanese Laid-Open Patent Application Publication No. 2006-259282, the cooling air discharged from a cooling fan is blown towards the DMD from the duct. The cooling air blown out of the duct contacts with the DMD, which improves the DMD cooling effect to a certain extent. However, when the cooling air blown from the duct contacts with the DMD, it is diffused, which means that the DMD cooling efficiency cannot be increased markedly.

In addition, employing a liquid cooling type of cooling method as indicated in Japanese Laid-Open Patent Application Publication No. 2006-259282 and Japanese Laid-Open Patent Application Publication No. 2007-127856 is impractical in terms of providing a projector that is simple and easy to handle because it requires a relatively large mechanism such as a radiator, a duct, a water pump, or the like.

SUMMARY OF THE INVENTION

The present invention is conceived in light of the above-mentioned problems. One object of the present invention is to provide a projector with which an optical arrangement of the projector is effectively cooled.

In accordance with one aspect of the present invention, a projector includes an optical arrangement and a cooling arrangement. The optical arrangement includes a light source, a filtering component, a light modulation component and a projection lens. The light source is configured to emit light. The filtering component is arranged to filter the light emitted by the light source. The light modulation component is arranged to modulate the light filtered by the filtering component to form an image. The projection lens is arranged to project the image formed by the light modulation component. The cooling arrangement is arranged relative to the optical arrangement to cool the optical arrangement. The cooling arrangement includes a blower, an air duct and a heat sink. The blower is configured to blow cooling air. The air duct is arranged to guide the cooling air from the blower to the filtering component along an cooling air path. The heat sink is disposed in the cooling air path within the air duct and fixedly attached to the light modulation component to thermally contact with the light modulation component.

With the projector of the present invention, it is possible to provide a projector with which an optical arrangement of the projector is effectively cooled.

These and other objects, features, aspects and advantages of the present invention will become apparent to those skilled in the art from the following detailed descriptions, which,

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
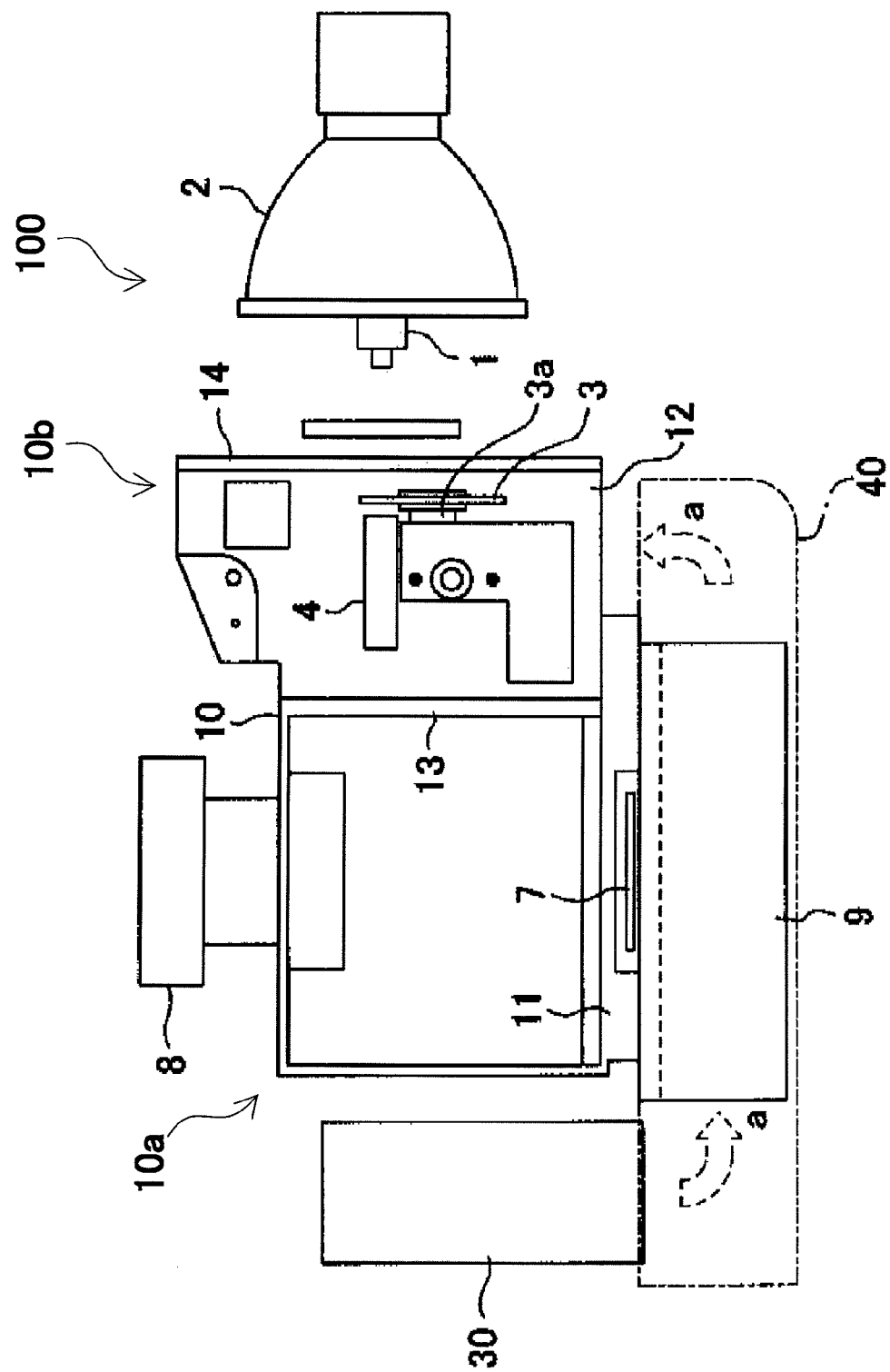
FIG. 1 is a simplified plan view of a projector in accordance with a first embodiment of the present invention.
Figure 2:
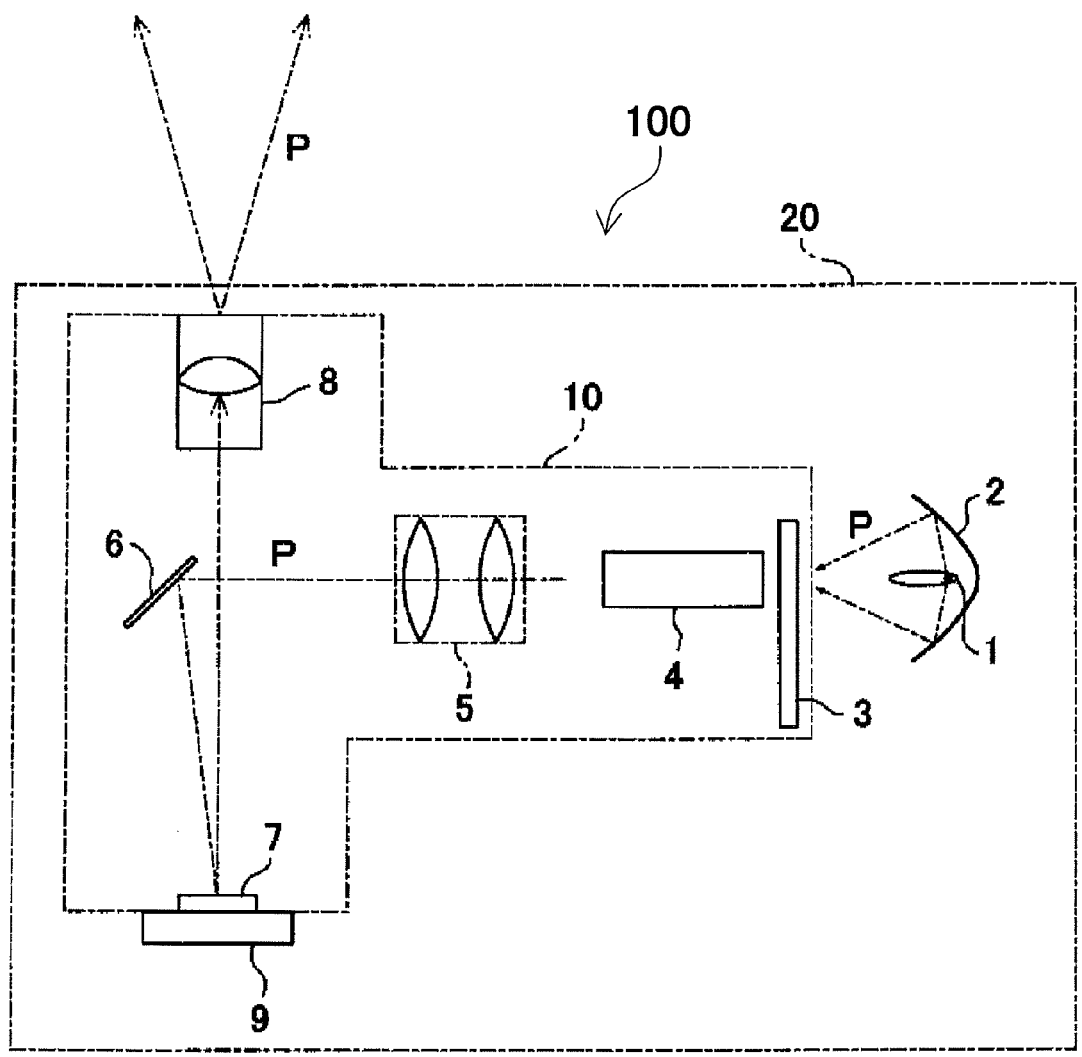
FIG. 2 is a simplified plan view of an optical engine system of the projector illustrated in FIG. 1.

FIG. 1 is a simplified plan view of a DLP (Digital Light Processing®) projector 100. FIG. 2 is a simplified plan view of an optical engine system of the projector 100. The projector 100 is a reflecting type of display device. In the projector 100, light from a light source 1 is filtered (e.g., split or converted), and the light is reflected on a DMD 7 (Digital Micromirror Device). The DMD 7 is a semiconductor element. The light reflected on the DMD 7 is expanded and projected by a projection lens 8. Then, image colorization is performed. In FIG. 2, an optical path P formed by the optical engine system is indicated by the one-dot chain line.

As shown in FIGS. 1 and 2, the projector 100 includes the light source 1, a reflector 2, a color wheel 3, a motor 3a, a light tunnel 4, a condenser lens 5, a mirror 6, the DMD 7, the projection lens 8, a heat sink 9, a housing 10, an external housing 20, a blower 30, and an air duct 40. The light source 1, the reflector 2, the color wheel 3, the motor 3a, the light tunnel 4, the condenser lens 5, the mirror 6, the DMD 7, the projection lens 8 and the housing 10 form an optical arrangement to project an image. In particular, the color wheel 3, the motor 3a and the light tunnel 4 form a filtering component to filter the light emitted by the light source 1. The condenser lens 5, the mirror 6 and the DMD 7 form a light modulation component to modulate the light filtered by the filtering component to form the image. The projection lens 8 projects the image. The heat sink 9, the blower 30 and the air duct 40 form a cooling arrangement to cool the optical arrangement. The cooling arrangement employs an air cooling type of cooling method.

The light source 1 emits light. The light emitted from the light source 1 is reflected by the reflector 2. The reflector 2 includes an elliptical mirror. The light reflected by the reflector 2 is successively filtered into R (red), G (green), and B (blue) by the color wheel 3. The color wheel 3 has RGB color filters. The light filtered by the color wheel 3 goes through the light tunnel 4 and the condenser lens 5. The light tunnel 4 has a rectangular cross section. Then, the light is reflected by the mirror 6, and is incident on the DMD 7. In other words, the light tunnel 4 guides the light to the DMD 7 via the condenser lens 5 and the mirror 6. The DMD 7 is driven under time division and in synchronization with RGB signal from a processor (not shown). The DMD 7 reflects the light to form the image. Then, the light goes through the projection lens 8, and is displayed on a screen (not shown). With the optical engine system such as this, the color wheel 3 is rotationally driven by the motor 3a. The color wheel 3, the motor 3a, the light tunnel 4, the condenser lens 5, the mirror 6, the DMD 7, the projection lens 8, and so forth are accommodated in the housing 10, and are fixedly attached to the housing 10 to maintain optically required precision. The housing 10 is a box-like member made of magnesium by a casting. The housing 10 is accommodated in the external housing 20 along with the light source 1 equipped with the reflector 2.

The light tunnel 4 is disposed at a right side portion of the housing 10 along with the color wheel 3 and the motor 3a. The DMD 7 is disposed at a rear side portion of the housing 10 that is an opposite side from a front portion of the housing 10 at which the projection lens 8 is disposed.

When the optical engine system is operating, the light source 1 generates heat up to a high temperature. The color wheel 3, the light tunnel 4, the DMD 7, and other components located on the light path P are also heated to a high temperature by the effect of the heat from the light source 1.

Figure 3:
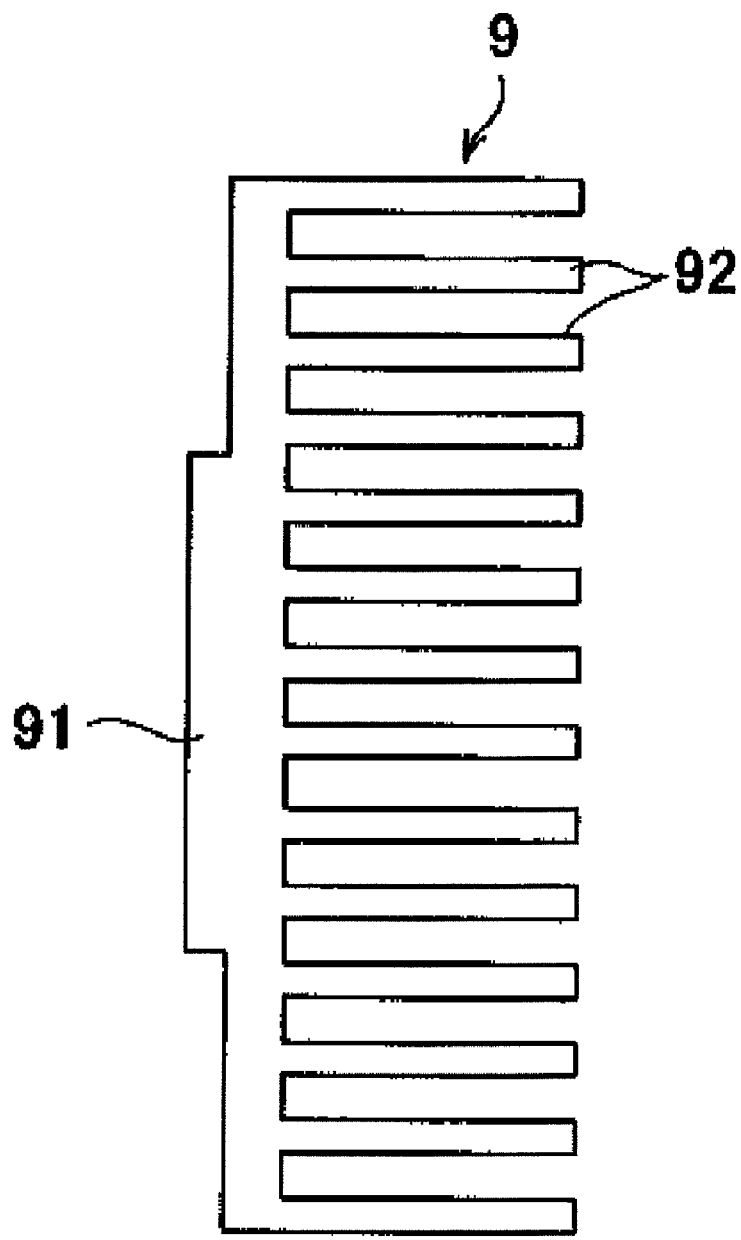
FIG. 3 is a side view of a heat sink of the projector illustrated in FIG. 1.

In view of this, the heat sink 9 is attached to the DMD 7 to thermally contact with the DMD 7. The heat sink 9 is exposed rearward from the rear side portion of the housing 10. Specifically, as shown in FIG. 3, the heat sink 9 has an attachment component 91 and a plurality of fins 92. The attachment component 91 is disposed across from the DMD 7 and fixedly attached to the DMD 7. The attachment component 91 has a plate-like shape. The fins 92 are integrally provided to the attachment component 91.

The housing 10 has a closed box portion 10a and an open box portion 10b. The closed box portion 10a is formed in a sealed box shape. The DMD 7 and the projection lens 8 are installed in the closed box portion 10a of the housing 10. The motor 3a, the color wheel 3 and the light tunnel 4 are installed on the open box portion 10b. The open box portion 10b is formed in a groove shape. The open box portion 10b includes a bottom plate 12 and side walls 13 and 14 disposed on either lateral side of the bottom plate 12. The light source 1 and the reflector 2 are disposed on a right side of the open box portion 10b of the housing 10, and are fixedly attached to the external housing 20.

Figure 4:
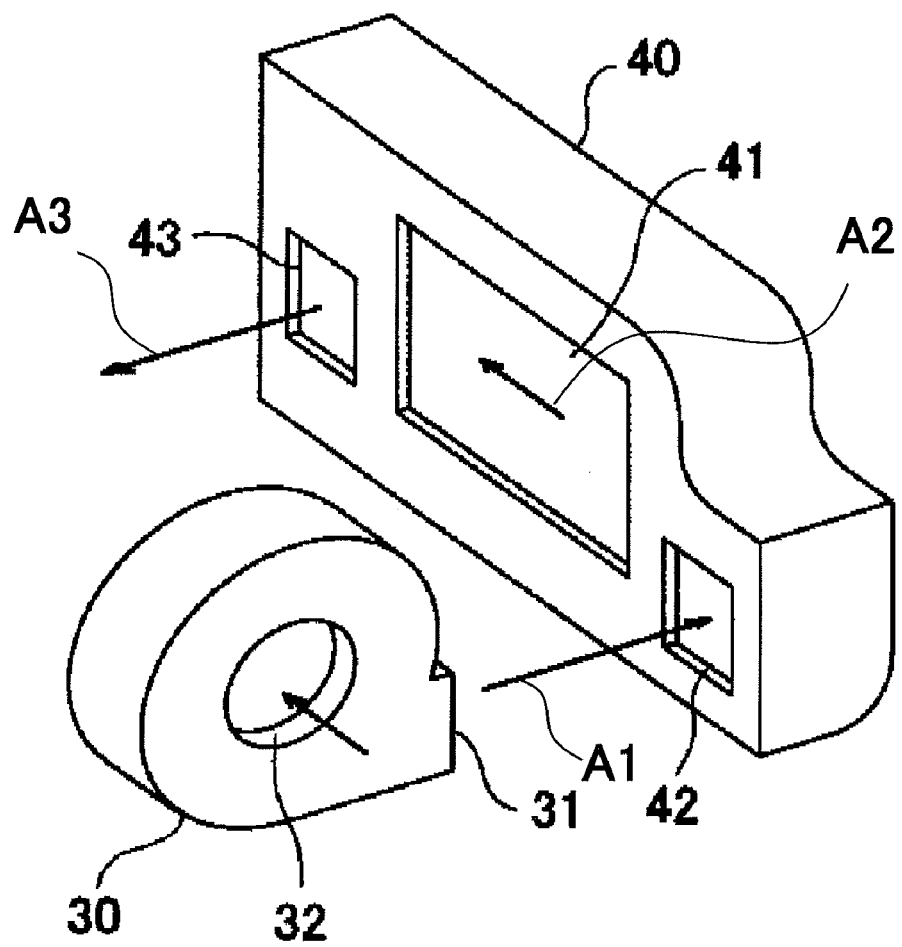
FIG. 4 is an exploded perspective view of an air duct and a blower of the projector illustrated in FIG. 1.

The blower 30 generates and discharges cooling air. The blower 30 is designed so that less of the cooling air is diffused. As shown in FIG. 4, the blower 30 includes a discharge opening 31 and an intake opening 32. The intake opening 32 draws the cooling air from outside of the external housing 20 through a ventilation opening of the external housing 20. The discharge opening 31 discharges the cooling air drawn through the intake opening 32

The air duct 40 is fixedly attached to a rear side of a rear wall 11 of the housing 10 to guide the cooling air from the blower 30. The air duct 40 is fixed to the rear wall 11 of the housing 10 from the rear side of the rear wall 11. Thus, the work of attaching the air duct 40 to the housing 10 is accomplished with ease.

The air duct 40 is molded from a resin. The air duct 40 has excellent heat resistance. The air duct 40 is formed in a flat box shape that is longer from side to side and is closed off. The heat sink 9 is installed inside of the air duct 40. The air duct 40 includes an attachment opening 41, an inlet (e.g., inlet opening) 42 and an outlet (e.g., outlet opening) 43. The attachment opening 41 is formed in a middle part of a front face of the air duct 40. The heat sink 9 is installed through the attachment opening 41. The attachment component 91 of the heat sink 9 is disposed through the attachment opening 41 to fix the DMD 7 thereon. The inlet 42 and the outlet 43 are formed on either side of the attachment opening 41 at lateral end portions of the air duct 40. The inlet 42 and the outlet 43 also open towards a front side of the air duct 40. The blower 30 is fixedly attached to the air duct 40 so that the discharge opening 31 of the blower 30 communicates with the inlet 42.

The air duct 40 is attached to the rear wall of the housing 10. The discharge opening 31 of the blower 30 communicates with the inlet 42 of the air duct 40 so that the inlet 42 takes or receives the cooling air discharged from the discharge opening 31 into the air duct 40. The outlet 43 faces or opens towards the open box portion 10b of the housing 10 from a rear side of the open box portion 10b. The outlet 43 communicates to an inside portion of the open box portion 10b formed between the side walls 13 and 14 so that the outlet 43 discharge the cooling air towards the open box portion 10b of the housing 10. The arrows A1, A2 and A3 shown in FIG. 4 indicate directions of movement of the cooling air discharged from the discharge opening 31 of the blower 30.

The cooling air is generated by the bower 30, which is designed so that less of the discharged cooling air is diffused. The fans, such as a sirocco fan or a forced air fan, are not preferable since the fans cause the cooling air to diffuse. The cooling air discharged by the blower 30 is sent along a unidirectional air path formed by the air duct 40. In other words, the unidirectional air path is formed as an internal channel of the air duct 40. Furthermore, the cooling air flows in a single direction from the blower 30 to the filtering component within the air duct 40. The cooling air directly contacts with the heat sink 9 in the air duct 40. Also, the cooling air discharged from the air duct 40 is blown towards the motor 3a and the light tunnel 4, which are installed in the open box portion 10b of the housing 10. In other words, the heat sink 9 is disposed upstream of the unidirectional air path with respect to the motor 3a and the light tunnel 4.

The blower 30 is disposed on a left side of the housing 10, which is an opposite side from the side on which the light source 1 is disposed. In other words, the blower 30 and the light source 1 sandwich the housing 10 in between. Thus, the cooling air drawn into the blower 30 tends not to be heated by the heat from the light source 1. As a result, low-temperature cooling air drawn in by the blower 30 is discharged from the blower 30 as the cooling air. Accordingly, as shown in FIG. 1, all of the cooling air that flows in directions of arrows a along the unidirectional air path directly contacts with the heat sink 9, which promotes heat dispersal at the heat sink 9. Therefore, temperature elevation of the DMD 7 is effectively suppressed. As a result, the DMD 7 loses less of its initial performance, and its durability also decreases less.

Also, as shown in FIG. 1, the cooling air is discharged from the outlet 43 as indicated by an arrow b after the cooling air passes through the air duct 40. Then, the cooling air is effectively guided to the motor 3a and the light tunnel 4. Accordingly, temperature elevation of the motor 3a and the light tunnel 4 is effectively suppressed. In particular, the housing 10 has the open box portion 10b in which the motor 3a and the light tunnel 4 are installed. Therefore, the cooling air discharged from the outlet 43 of the air duct 40 is guided by the groove-shaped portion formed by the bottom plate 12 and the side walls 13 and 14 and directly contacts with the motor 3a and the light tunnel 4. As a result, compared to when the cooling air is merely blown at the motor 3a and the light tunnel 4, the cooling action is more pronounced, which improves the durability of the motor 3a and the light tunnel 4.

With the projector 100, in addition to using the blower 30 with which the discharged air tends not to diffuse as the means for generating cooling air, the cooling air discharged by the blower 30 directly contacts with the heat sink 9 disposed inside the air duct 40 while being guided through the unidirectional air path inside the air duct 40. Therefore, substantially all of the cooling air discharged by the blower 30 is used to promote heat dispersal at the heat sink 9. Thus, the temperature elevation of the DMD 7 to which the heat sink 9 is attached is efficiently suppressed. Also, the cooling air that passes through the air duct 40 is discharged towards the light tunnel 4 and the motor 3a used for rotationally driving the color wheel 3 only after first direct contacting with the heat sink 9. Thus, the cooling air with little diffusion is also blown against the light tunnel 4, the motor 3a, etc. As a result, temperature elevation of the light tunnel 4 and the motor 3a is also efficiently suppressed.

With the projector 100, the motor 3a, color wheel 3, the DMD 7 and the projection lens 8 are attached to the housing 10 shared by them. The light source 1 is disposed on one side of the housing 10 and the blower 30 on the other side. The heat sink 9 is disposed to expose on the rear side of the housing 10. The discharge opening 31 of the blower 30 opens rearward towards the rear wall 11 of the housing 10 and communicates with the inlet 42 of the air duct 40 in which the heat sink 9 is accommodated. The outlet 43 of the air duct 40 opens out facing a rear portion of the open box portion 10b where the motor 3a, color wheel 3 and the light tunnel 4 are installed.

With the projector 100, since the housing 10 is interposed between the blower 30 and the light source 1 that generates so much heat, heating by the light source 1 tends to have little effect on the cooling air drawn in by the blower 30. Therefore, the blower 30 discharges the cooling air that has a low temperature. Thus, heat dispersal at the heat sink 9 is promoted when the low-temperature cooling air contacts with the heat sink 9. Also, since the air duct 40 is disposed on the rear side of the housing 10, there is no need for the housing 10 to be formed in a complicated shape, such as a ring shape, and the configuration becomes much simpler.

The projector 100 employs a means for effectively guiding the cooling air with the air duct 40 all the way to the heat sink 9 and other optical elements that are to be cooled. Thus, the cooling efficiency of the DMD 7 and other such optical elements is markedly improved. This not only affords greater latitude in the temperature specifications of the optical elements, but also raises the utilization efficiency of the cooling air. Therefore, the optical elements lose less of their initial performance, and their durability decreases less. As a result, the user can see a projected image that remains stable over an extended period.

Second Embodiment

Figure 5:
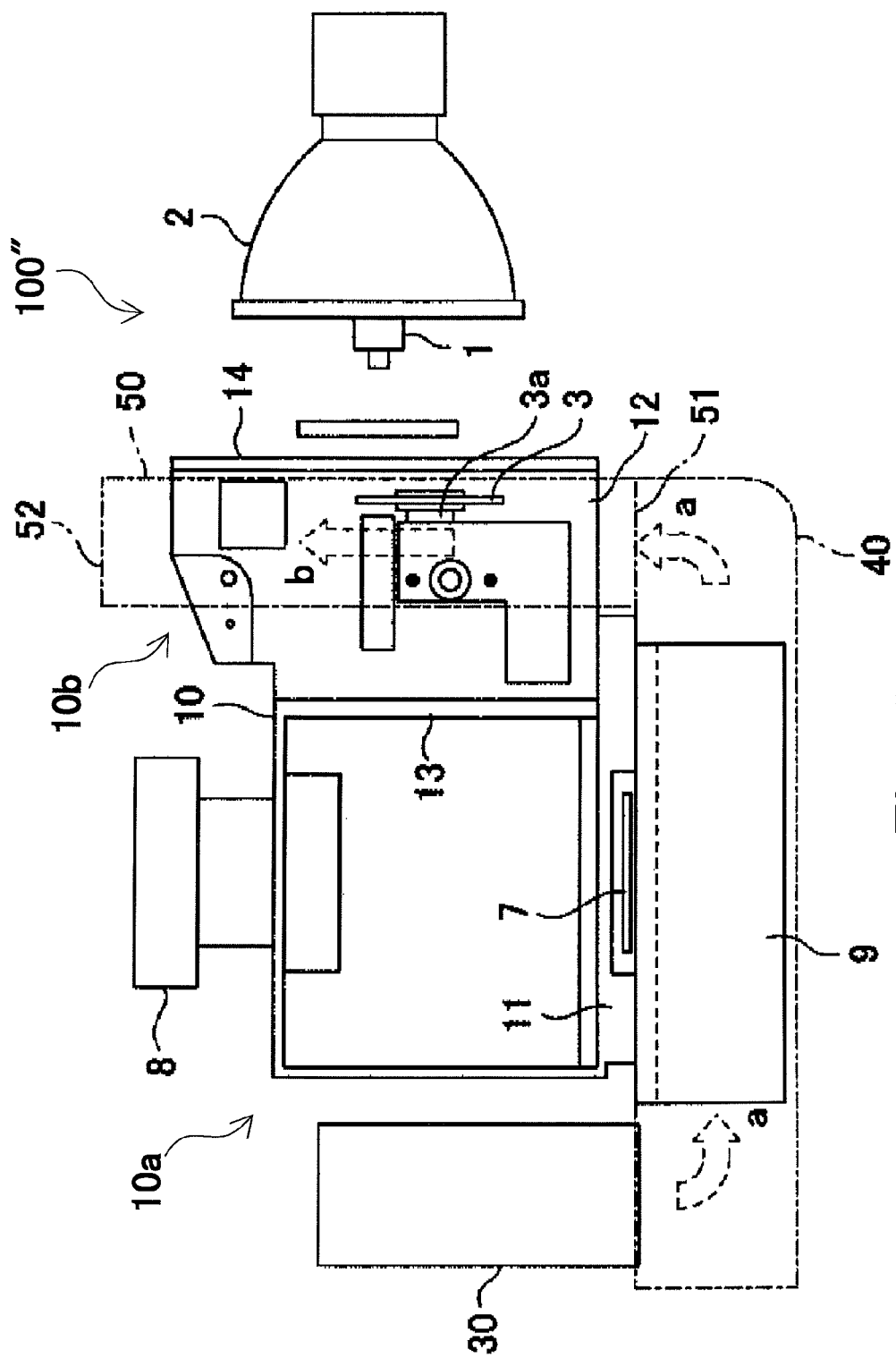
FIG. 5 is a simplified plan view of a projector in accordance with a second embodiment of the present invention.
Figure 6:
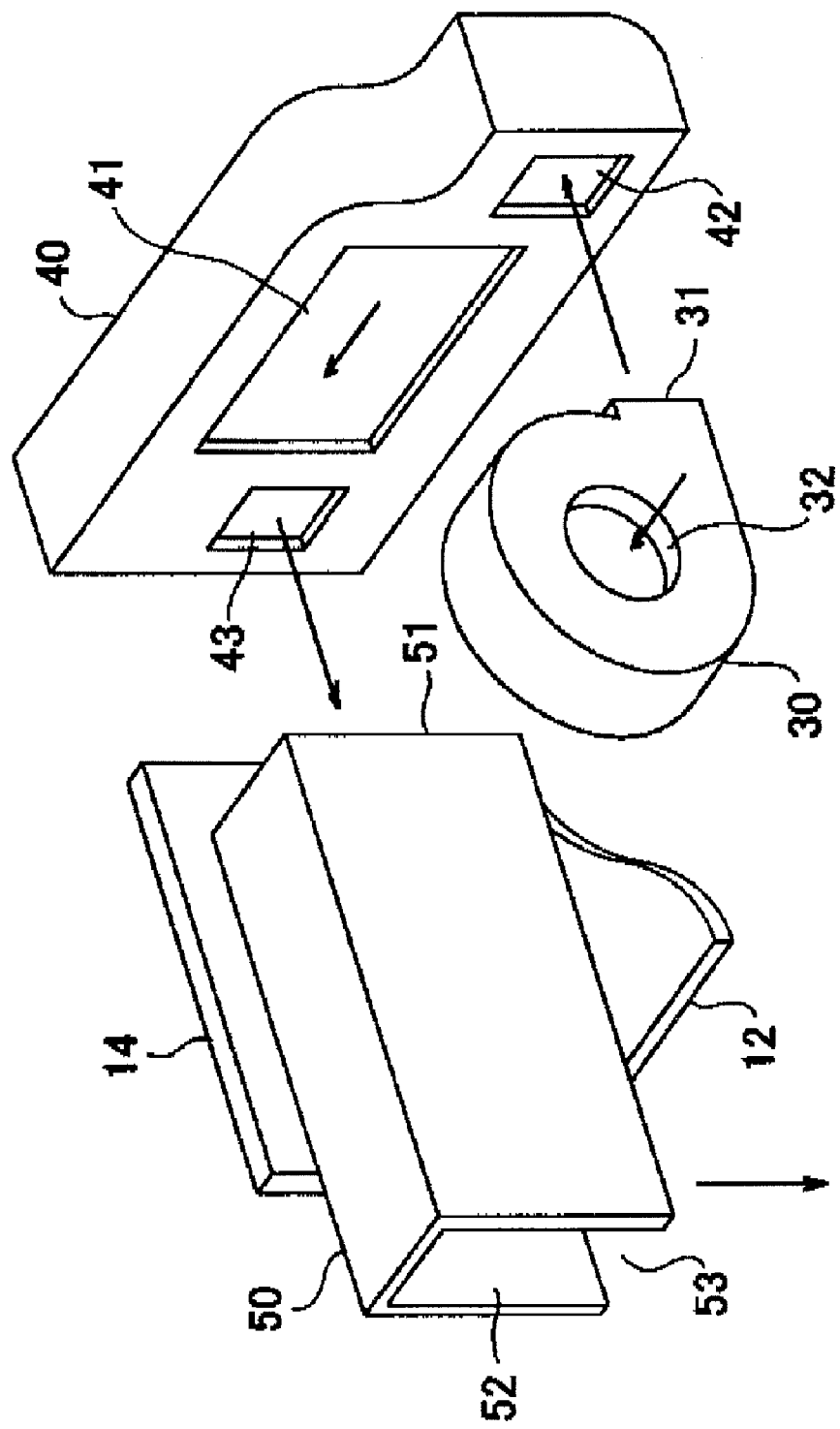
FIG. 6 is an exploded perspective view of an air duct, a blower and a hood of the projector illustrated in FIG. 5.

Referring now to FIGS. 5 and 6, a projector 100" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 5 and 6, the projector 100" further includes a hood 50 in addition to the projector 100 described through reference to FIGS. 1-4. The hood 50 further enhances the efficiency of cooling the motor 3*a* and the light tunnel 4. The hood 50 also muffles the noise made by the motor 3*a*. The hood 50 is integrally molded from a resin as a one-piece, unitary member. The hood 50 is formed in a portal shape (e.g., U-shape). The hood 50 has excellent heat resistance. More specifically, as shown in FIG. 6, the hood 50 has a top plate and side plates extending downward from the top plate to form a rear opening 51, a front opening 52 and a bottom opening 53. The rear opening 51 is formed at one end in a lengthwise direction of the hood 50. The front opening 52 is formed at the other end in the lengthwise direction of the hood 50. The rear opening 51 communicates with the outlet 43 of the air duct 40. The hood 50 is placed over the open box portion 10*b* of the housing 10. The bottom opening 53 of the hood 50 is blocked off by the bottom plate 12 of the housing 10 so that the unidirectional air path that accommodates the motor 3*a*, the color wheel 3 and the light tunnel 4 is formed by a surrounding space between the hood 50 and the bottom plate 12 of the housing 10.

The heat sink 9 is accommodated in the air duct 40. The motor 3*a*, the light tunnel 4, and so forth are surrounded by the hood 50 and the bottom plate 12 of the housing 10. Thus, the cooling air discharged from the discharge opening 31 of the blower 30 directly contacts with the heat sink 9 while passing along the unidirectional air path through the air duct 40, which markedly promotes heat dispersal at the heat sink 9. Furthermore, the cooling air discharged from the outlet 43 of the air duct 40 directly contacts with the motor 3*a* and the light tunnel 4 while passing through the hood 50, which markedly promotes cooling of the motor 3*a* and the light tunnel 4. Therefore, the DMD 7, the motor 3*a* and the light tunnel 4, and so forth lose less of their initial performance, and their disabilities are also increased. Also, since the hood 50 muffles the noise generated by the motor 3*a*, the projector 100" becomes quieter.

The hood 50 is attached to the housing 10 by fitting the hood 50 over the groove-shaped open box portion 10*b* of the housing 10 from above.

With the projector 100", the hood is added to cover the motor 3*a*, the color wheel 3 and the light tunnel 4. The cooling air discharged from the outlet 43 of the air duct 40 is not merely discharged towards the motor 3*a* and the light tunnel 4, but passes through the inside of the hood 50 and is guided so as to directly contacts with the motor 3*a* and light tunnel 4. Accordingly, heat dispersal at the heat sink 9 is promoted and temperature elevation of the motor 3*a* and light tunnel 4 is suppressed. Furthermore, the bottom opening 53 of the hood 50 is blocked off by the bottom plate 12 of the housing 10 so that the unidirectional air path that accommodates the motor 3*a*, the color wheel 3 and the light tunnel 4 is formed by the surrounding space of the hood 50 and the bottom plate 12 of the housing 10. Also, since the air duct 40 and the hood 50 do not form a ring-shaped circulation path, the air duct 40 and the hood 50 have a simple construction. Since the hood 50 covers the motor 3*a*, a sound-deadening action is also obtained whereby noise made by the motor 3*a* is blocked by the hood 50.

Furthermore, the air duct 40 can be produced inexpensively because of its simple construction.

With the projector 100", the blower 30 is employed as the means for generating the cooling air, and the cooling air discharged by the blower 30 is effectively guided to the heat sink 9 and the optical elements by the air duct 40 and the hood 50. Thus, cooling action is exhibited through direct contact of the cooling air with the heat sink 9 and the optical elements. Therefore, it is possible to markedly improve the cooling action with a simple construction.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a projector equipped with the present invention. Accordingly, these terms, as utilized to describe the present invention should be interpreted relative to a projector equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A projector comprising:
    an optical arrangement including
        a light source configured to emit light,
        a filtering component arranged to filter the light emitted by the light source,
        a light modulation component arranged to modulate the light filtered by the filtering component to form an image, and
        a projection lens arranged to project the image formed by the light modulation component in a forward direction of the projector; and
    a cooling arrangement arranged relative to the optical arrangement to cool the optical arrangement, the cooling arrangement including
        a blower configured to blow cooling air in a rearward direction of the projector,
        an air duct arranged to guide the cooling air from the blower to the filtering component along an cooling air path, and
        a heat sink disposed in the cooling air path within the air duct, the heat sink having an attachment portion, the attachment portion being fixedly attached to the light modulation component to thermally contact with the light modulation component,
    the air duct having a front plate facing in the forward direction of the projector, the front plate including an inlet hole, an outlet hole and an attachment hole, the inlet hole communicating with a discharge opening of the blower to receive the cooling air blown from the blower in the rearward direction of the projector, the outlet hole opening towards the filtering component to discharge the cooling air towards the filtering component in the forward direction of the projector, the attachment portion of the heat sink being disposed through the attachment hole such that the light modulation component being forwardly disposed relative to the front plate of the air duct.

2. The projector according to claim 1, wherein
the filtering component further has a motor, a color wheel that is rotationally driven by the motor to filter the light emitted by the light source, and a light tunnel that is arranged to guide the light filtered by the color wheel to the light modulation component.

3. The projector according to claim 2, wherein
the light tunnel has a rectangular cross section.

4. The projector according to claim 3, wherein
the light modulation component includes a digital mirror device that is arranged to reflect the light filtered by the filtering component to form the image, and
the heat sink is fixedly attached to the digital mirror device.

5. The projector according to claim 4, wherein
the heat sink is disposed upstream of the cooling air path with respect to the motor and the light tunnel.

6. The projector according to claim 5, wherein
the cooling air directly contact with the heat sink within the air duct.

7. The projector according to claim 6, wherein
the cooling air flows in a single direction from the blower to the filtering component within the air duct.

8. The projector according to claim 1, wherein
the optical arrangement further includes a housing that houses the filtering component, the light modulation component and the projection lens,
the light source of the optical arrangement is disposed on one lateral side of the housing,
the blower of the cooling arrangement is disposed on the other lateral side of the housing, and
the air duct of the cooling arrangement is attached to a rear side of the housing.

9. The projector according to claim 8, wherein
the inlet and outlet holes of the air duct open towards a front side of the air duct.

10. The projector according to claim 9, wherein
the optical arrangement further includes a hood with front and rear end openings that covers the filtering component from above, the rear end opening communicating with the outlet opening of the air duct.

11. The projector according to claim 10, wherein
the hood has a U-shape cross section with a bottom opening on a bottom side of the hood.

12. The projector according to claim 11, wherein
the hood is disposed on a bottom plate of the housing to form a surrounded space that houses the filtering component between the hood and the bottom plate of the housing, and
the cooling air discharged from the outlet opening flows through the surrounded space.

* * * * *